Figure 1:
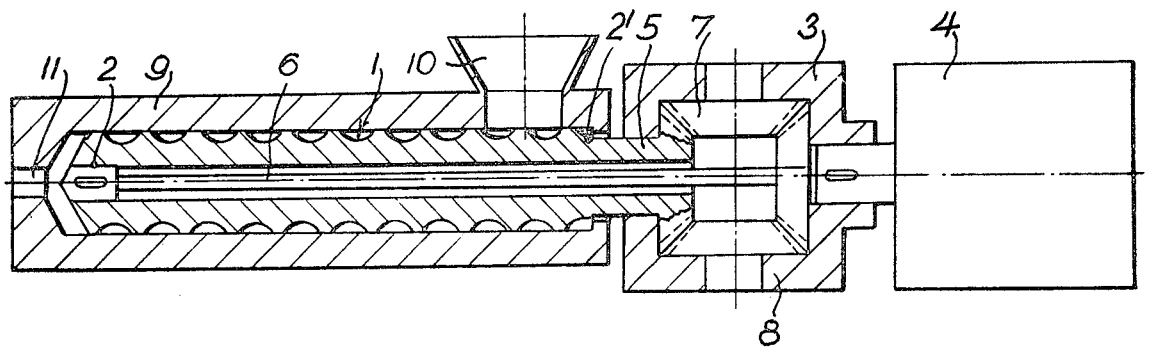

United States Patent [19]
Blach et al.

[11] 3,734,635
[45] May 22, 1973

[54] SHAFT IN PARTICULAR SCREW SHAFT FOR FEEDING OR KNEADING OF RAW MATERIAL, BY EXAMPLE SYNTHETIC MATERIAL

[76] Inventors: Josef Blach, Uhlandstrasse 4, D 7121 Grossingersheim, Germany; Heribert Blach, Auhof Altenbergerstrasse 69, Linz, Danube, Austria

[22] Filed: Apr. 1, 1971

[21] Appl. No.: 130,373

[30] Foreign Application Priority Data

Apr. 2, 1970 Austria....................................3007

[52] U.S. Cl.............415/72, 416/176, 418/201, 418/48, 259/209, 425/376
[51] Int. Cl.............................F01c 1/16, F01d 1/02
[58] Field of Search............415/72, 73; 425/376; 198/213; 259/209–210; 416/176; 418/48, 201

[56] References Cited

UNITED STATES PATENTS

| | | | |
|---|---|---|---|
| 2,505,136 | 4/1950 | Moineau | 418/48 |
| 2,527,673 | 10/1950 | Byram | 418/48 |
| 3,307,453 | 3/1967 | Nilsson et al. | 418/201 |
| 1,498,678 | 6/1924 | Chavrier | 74/705 |
| 3,164,375 | 1/1965 | Frenkel | 425/376 |
| 3,359,829 | 12/1967 | Busch et al. | 74/705 |

FOREIGN PATENTS OR APPLICATIONS

| | | | |
|---|---|---|---|
| 1,120,175 | 4/1956 | France | 425/376 |

*Primary Examiner*—Henry F. Raduazo
*Attorney*—Ernest G. Montague

[57] ABSTRACT

A shaft, in particular a worm shaft for conveying or kneading of raw material, for example synthetic material, which comprises a hollow shaft and at least one coaxial shaft disposed in the hollow shaft. The hollow shaft and the coaxial shaft are operatively connected at least at one point, and means are provided for driving the shafts with the same angular speed.

4 Claims, 2 Drawing Figures

SHAFT IN PARTICULAR SCREW SHAFT FOR FEEDING OR KNEADING OF RAW MATERIAL, BY EXAMPLE SYNTHETIC MATERIAL

The present invention relates to a shaft, in particular a worm shaft for feeding, conveying or kneading of raw material, by example synthetic material.

It is known that in driven shafts, the surface, form and material of which is determined in the first place by the outer task, by example, the conveying of material and the form and quality of the surface of the shaft has a great influence on the highest permissible stress.

For a highest possible torque guide, the surface should be smoothly polished, buffed, the work material improved under circumstances, compressed and hardened. The better these presumptions are fulfilled, the higher can be chosen the permissible stress and so much greater can be the torque to be fed in. The surface of the shaft feeding in the torque is, however, not only bound to the inner task, rather also to an outer task, if, for instance, a conveyor screw is cut on the shaft or the wedge groove is disposed for branching the torque by means of gears, bushings, etc.

Then, as a permissible load only a portion of the possible can be chosen.

It is an object of the present invention to provide a shaft, in particular, a worm shaft for feeding, conveying or kneading of raw material, in particular synthetic material, wherein in such cases at a given cross-section of a shaft the transmission of an appreciably higher torque is made possible.

It is another object of the present invention, to provide a shaft, in particular a worm shaft for feeding or kneading of raw material, wherein the shaft comprises a hollow shaft and at least one coaxial shaft disposed in the bore of the hollow shaft, and the hollow shaft and the coaxial shaft are operatively connected at least at one point, preferably at one of the ends, and the drive of these shafts takes place with equal angular speed.

A particular application is provided in screw machines, which are applied in the working of synthetic material. Here, as a measure for the efficiency and the price value of the different machines, the ratio between ejection output and screw diameter, and the investing costs and the efficiency, respectively. For the production of homogeneous products, proper for use, as to mixture quality and appearance, it is required to guide the essential part of the energy to be provided during the working over the screw shafts by the torque and not over the outer heating into the synthetic material.

The simultaneous formation of the surface of the shaft surface as a feeding screw and/or kneading member requires that the material of the shaft in the surface quality is determined by the material to be fed or to be worked. Working material and shaft surface cannot be arranged therefore in accordance with the maximum torque.

In another case the inner task of the torque guide from one shaft with a groove and the outer task of the material feeding and kneading, respectively, of so-called screw bushings is assumed. It is possible thereby, in accordance with the different tasks to use correspondingly specific working materials. By the wedge groove, required for the torque transfer from the shaft to the bushing, a substantial reduction of the torque is taken in stride. Screw machines with such structure are likely to be designed as so-called double screw machines.

In this case the screw cam of a screw projects the screw base of the second screw such, that the screw profiles run meshing towards each other with slight play. By the low distance of the axes of the two shafts resulting thereby, the possible torque feed is limited and the drives required therefore are very expensive. A reciprocal drive of the screws with normal drives, which have often a ratio of the length to the screw diameter up to 50 : 1, it is not possible, since now by the reciprocal addition of the shaft rotation angle, they would run into each other.

The present invention made possible, in case of nearly a double torque, to bring about an essential reduction of the operational costs in case of multi-shaft screws meshing with a slight play, without requiring to arrange particular limitations and steps in the screw construction.

Figure 2:
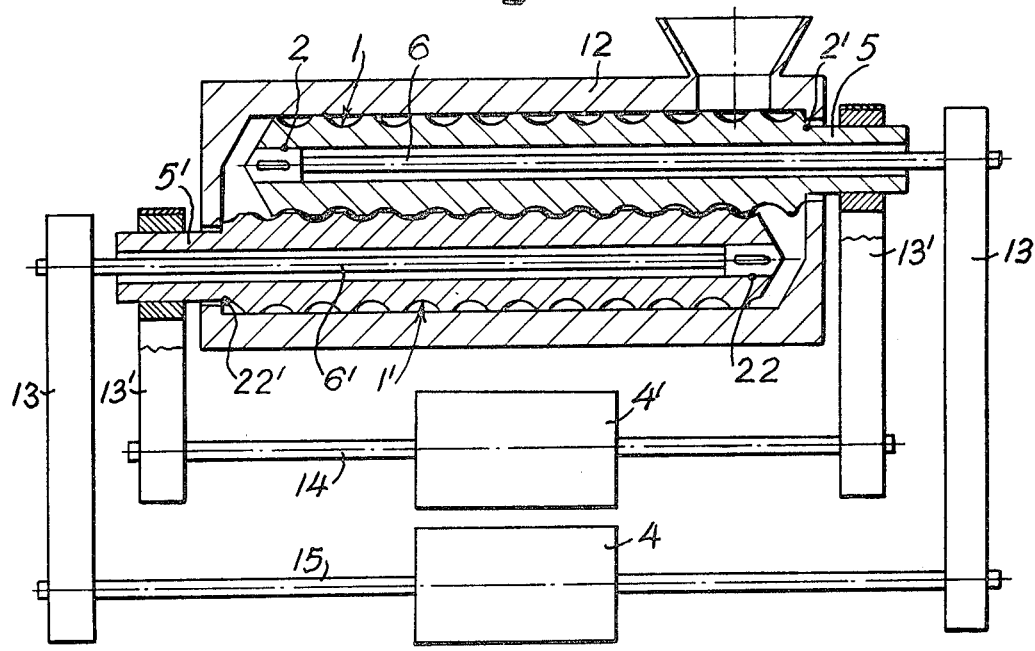

With these and other objects in view, which will become apparent in the following detailed description, the present invention which is shown by example only, will be clearly understood in connection with the accompanying drawings, in which:

FIG. 1 is a longitudinal section of the shaft of an extruder in accordance with the present invention; and FIG. 2 is a longitudinal section indicating the screw shaft of a double screw machine.

Referring now to the drawings, the shaft, formed as a worm shaft for feeding and plastisizing of plastic synthetic material, by example in an extruder, is mounted in a housing 9 equipped with a feeding funnel 10 and an outlet opening 11. It comprises a hollow shaft 5 carrying the screw and a coaxial shaft 6 disposed in the bore of the hollow shaft 5, whereby the hollow shaft 5 and the coaxial shaft 6 are operatively connected for joint forces at 2 point at one of their ends. The drive takes place by means of a driving motor 4, the total output of which is divided by power-or output-comparison and is fed into the shaft 1 at 2 points and 2', whereby the output and the torque, respectively fed at the point 2, is transmitted by means of the shaft 6. The total torque is halved exactly by the bevelled gears 7 and 8 of the torque balance 3 and guided by the unequal rotary angles of the shafts 5 and 6 independently from the transfer points 2 and 2'. By this arrangement, the shafts can be driven independently from the torque and the length of the hollow shaft synchroneously with the rotary angle.

Referring now again to the drawings and in particular to FIG. 2, in the housing 12, there are arranged two meshing hollow screw shafts 5 and 5', in which a coaxial shaft 6 and 6', respectively, is disposed. The shafts 5 and 6 and 5' and 6', respectively, are rigidly connected together at their free ends at 2 and 22, respectively. The required torque is introduced each for a quarter at the points of the screw shafts 2 and 2' and 22 and 22', respectively, which is produced in equal parts by two motors 4 and 4'. The motors 4 and 4' drive by means of the shafts 14 and 15, respectively, by means of drives 13 and 13', respectively, the coaxial shafts 6 and 6', and the hollow screw shafts 5 and 5', respectively. By this arrangement the rotary angles of the shafts equalize each other independently from their length and the torque fed thereto, so that they do not run into each other even at the low play.

While we have disclosed several embodiments of the present invention, it is to be understood that these embodiments are given by example only and not in a limiting sense.

We claim:

1. A shaft, in particular a worm shaft for conveying or kneading of raw material, for example synthetic material, comprising
an outermost member constituting a housing,
at least one hollow shaft exclusively disposed inside of said housing and having an outer worm periphery,
at least one coaxial shaft disposed in said at least one hollow shaft,
said at least one hollow shaft and said at least one coaxial shaft being operatively connected at least at one point, and
separate torque driving means for rotatably driving each of said shafts with the same angular speed from opposite end connections to said shafts.

2. The shaft, as set forth in claim 1, wherein
each of said separate torque driving means include one driving motor only, and
a torque balance is disposed between said driving motor and one of the ends of said hollow shaft and said coaxial shaft.

3. The shaft, as set forth in claim 1, which includes a plurality of shafts,
means for driving said shafts with equal rotary angles, and
rigid shafts operatively connecting said plurality of shafts.

4. The shaft, as set forth in claim 2, wherein
said torque balance includes,
a first bevel gear connected to each of said torque driving means and coaxially disposed relative to said coaxial shaft,
a pair of oppositely oriented bevel gears coaxially aligned perpendicular to said first bevel gear and meshing therewith at opposite portions of the latter, and
said hollow shaft including a peripheral ring bevel gear meshing at opposite portions with said pair of bevel gears.

* * * * *